March 10, 1970 R. O. ROWLANDS ET AL 3,499,985

TWO-WAY PULSE REPEATER

Filed March 2, 1967

INVENTORS
RICHARD O. ROWLANDS
EDWARD L. ROHM

BY Henry Hansen
Jerome C. Squillaro
ATTORNEYS

United States Patent Office 3,499,985
Patented Mar. 10, 1970

3,499,985
TWO-WAY PULSE REPEATER
Richard O. Rowlands and Edward L. Rohm, State College, Pa., assignors, by mesne assignments, to the United States of America as represented by the Secretary of the Navy
Filed Mar. 2, 1967, Ser. No. 621,101
Int. Cl. H04l 25/20, 25/52, 15/00
U.S. Cl. 178—70 10 Claims

ABSTRACT OF THE DISCLOSURE

A two-way pulse communications system for communication between two remotely located stations by coded pulse trains over a single transmission path including bidirectional pulse repeater networks spaced periodically along the length of the transmission line for regeneration of the coded pulses in both amplitude and time. The bidirectional regeneration is accomplished by a complementary arrangement of two pulse amplifier circuits in an arrangement whereby only one of the two amplifiers is operative at any one time.

BACKGROUND OF THE INVENTION

The present invention relates to the communication of information by pulses and more particularly, to the regeneration in both amplitude and time of bilevel pulses which during the course of transmission are attenuated and distorted.

Present day two-way pulse communication systems require two transmission paths, one for one direction of transmission and the other for the return transmission path. Such communication systems require a complete duplication of equipment to provide the two-way communication link. In addition to the high cost of such a system, two transmission lines are required for a single communication, and since only one line is used at any one time, such systems fail to utilize their equipment to the fullest possible extent.

SUMMARY OF INVENTION

The present invention overcomes the foregoing difficulties by providing a bidirectional pulse repeating network which embraces all the advantages of similarly employed pulse repeating networks and in addition enables two-way communication over a single low cost transmission path, thereby enabling maximum utilization of the communications equipment. To attain this, the present invention contemplates the complementary arrangement of two pulse repeaters in a single package for direct connection in a transmission line. The present invention further contemplates the separation of a D.C. power source from the signal information by transmitting the power as a longitudinal current and the signal information as a transverse current as described in copending application Ser. No. 560,379, filed June 21, 1966, for Pulse Repeater, of common assignee.

An object of the present invention is therefore to provide a bidirectional pulse repeater network for use in a two-way communications system and in which pulse information is regenerated in either direction of propagation and wherein inexpensive balanced pair transmission lines may be utilized to their maximum capabilities.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

DESCRIPTION OF PREFERRED EMBODIMENTS

Figures 1, 2, 3:
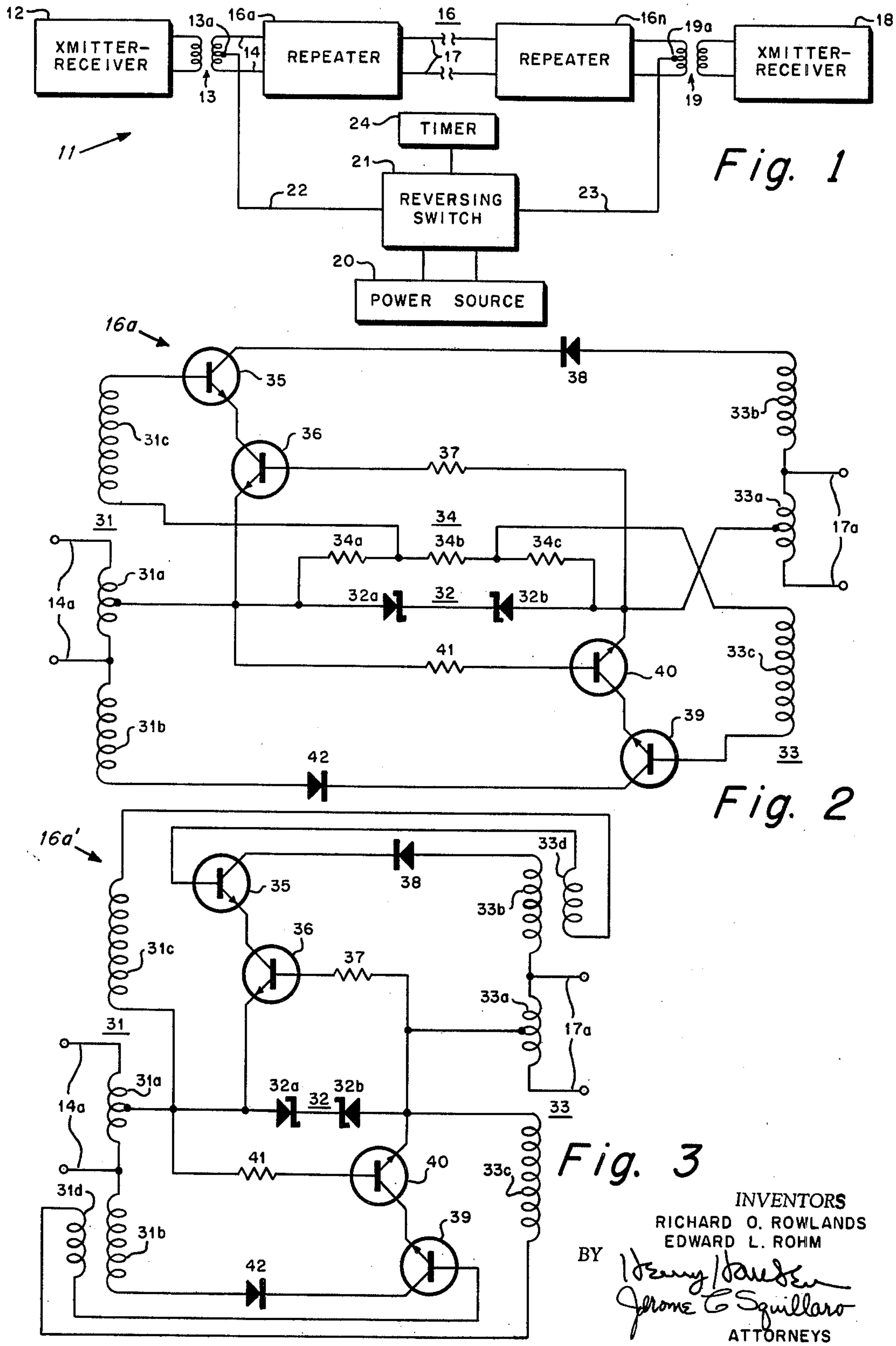
FIG. 1 illustrates a partial block and schematic diagram of a two-way pulse communication system according to the present invention.
FIG. 2 illustrates a schematic diagram of a bidirectional pulse repeater network which may be employed in the system of FIG. 1.
FIG. 3 illustrates a schematic diagram of an alternative embodiment of a bidirectional pulse repeater.

Referring now to FIG. 1, there is shown a two-way pulse communications system 11 comprising a transmitter-receiver station 12 for both sending and receiving messages by coded pulse trains. The coded pulse trains transmitted and received by the station 12 are coupled by a transformer 13 to a first section of transmission line 14 which may be of any convenient length, so long as the loss in pulse amplitude is not so great as to prevent regeneration of the coded message. The transmission line 14 is then electrically connected to a repeater network 16 comprising a plurality of bidirectional pulse repeaters generally indicated as **16*a* and 16*n*. These repeaters are connected together through a transmission line 17 and the output of the final repeater 16*n* is connected to a remotely located transmitter-receiver station 18 by a transformer 19. The transmitter-receiver 18 is similar to the transmitter-receiver station 12** but remotely located therefrom.

Operating power for the pulse repeaters 16 is provided by a power source 20 such as a battery or other direct current source. The positive and negative output terminals from the power source 20 are connected to a polarity reversing switch 21 which may be any of a variety well known to those skilled in the art; for example, a simple double-pole, double-throw relay actuated switch could be employed for this purpose. The outputs from the reversing switch 21 are coupled through conductors 22 and 23 to center taps **13*a* and 19*a* of transformers 13 and 19, respectively. The function of the reversing switch 21 is to reverse the polarity of the voltage applied to the repeater network 16 so that a two-way communication link can be established between the transmitter-receiver station 12 and the transmitter-receiver station 18** over a single transmission path.

To actuate the reversing switch 21 at selected time intervals, a timer 24 is illustrated as being connected to the polarity reversing switch 21 for controlling the polarity of the voltage applied to conductors 22 and 23 and hence the interval of time during which station 12 is transmitting and station 18 is receiving or when station 18 is transmitting and station 12 is receiving. Although this polarity reversing switch is illustrated as being controlled by a timer 24, obviously the switch may also be controlled by a particular code sequence received at either station upon which receiving such code, reverses the polarity of the applied voltage thereby enabling the station to change from a transmitting to a receiving mode of operation or vice versa.

In order that a two-way communications link may be provided over a single transmission line with many regenerative repeaters spaced periodically along the line, it is necessary that each repeater exhibit bidirectional regenerative characteristics. A repeater 16 having such characteristics is shown schematically in FIG. 2 in which the input terminals **14*a* and output terminals 17*a* of the repeater are illustrated as being connected to transmission lines 14 and 17, respectively. Although terminals 14*a* are referred to as the input terminals and 17*a*** as the output terminals for regeneration in one direction, it is to be understood that for regeneration in the opposite direction, the input and output terminals would be reversed.

Referring now to the electrical schematic diagram of FIG. 2, input terminals 14*a* are connected to *a* low reactance transformer 31 having a center tapped input winding 31*a* and a serially connected output winding 31*b* and a secondary winding 31*c*. Connected to the center tap of input winding 31*a* is one end of a source of bias voltage 32 comprising a pair of oppositely poled and serially connected Zener diodes 32*a* and 32*b*. The other end of the source of bias potential 32 is connected to the center tap of an input winding 33*a* of a transformer 33, similar to transformer 31. Serially connected with the input winding 33*a* is an output winding 33*b* and transformer-coupled to the input winding 33*a* is a secondary winding 33*c*. In parallel with the source of bias voltage 32 is a voltage divider network 34 comprising serially connected resistors 34*a*, 34*b* and 34*c*. The function of the voltage divider network is to provide biasing for the repeater circuit 16 as will be described. Connected to the junction of resistors 34*a* and 34*b* is one end of the secondary transformer winding 31*c* with the other end of this winding connected to the base electrode of a transistor 35. The emitter electrode of this transistor is connected to the collector electrode of a transistor 36 and the emitter electrode of this transistor is connected to the center tap of input winding 31*a*. The base electrode of transistor 36 is connected to the center tap of transformer 33*a* through a biasing resistor 37. The collector of transistor 35 is connected to one end of transformer winding 33*b* through a diode 38 having its cathode connected to the collector electrode.

Secondary winding 33*c* has one end connected to the base electrode of a transistor 39 with its emitter electrode connected to the collector of a transistor 40, the emitter electrode of which is connected to the center tap of input winding 33*a*. The base electrode of transistor 40 is connected to the center tap of input winding 31*a* through a biasing resistor 41. The collector electrode of transistor 39 is connected to one end of winding 31*b* through a diode 42 having its cathode connected to the collector electrode.

Having thus described the interconnection of elements for the repeater circuit 16, the operation thereof will now be described with reference to FIGS. 1 and 2. Assume that the voltage appearing on conductor 23 is more positive than that appearing on conductor 22 and accordingly, a voltage drop from terminals 17*a* to 14*a* of the repeater network 16 is experienced. Since the source of power is coupled to the repeater network 16 through the center taps 13*a* and 19*a* of transformers 13 and 19, respectively, the current will divide and flow along both conductors of the transmision lines and be combined at the input winding of the repeater network 16*a* and then be divided again at the output winding of the same repeater network for transmission to the next repeater network. Whereas the power flow along the transmission line is longitudinal, the signal flow is transverse thereto as described in the above-referenced copending application.

As a result of the voltage drop appearing between terminals 14*a* and 17*a*, Zener diode 32*a* is operating in the Zener region whereas diode 32*b*, being oppositely poled with respect to diode 32*a*, is operating in the forward conduction region and does not contribute significantly to the overall voltage drop across the bias source 32. The bias source 32 in conjunction with the voltage divider network 34 provide forward biasing for transistors 35 and 36 and reverse biasing for transistors 39 and 40. This is accomplished by selecting appropriate component values; for example, in the embodiment of FIG. 2, resistors 34*a* and 34*c* may be 470 ohms, 34*b* may be 2,200 ohms, resistors 37 and 41 may be 10,000 ohms and Zener diodes 32*a* and 32*b* may be 6.8 volt breakdown diodes. In this manner, the voltage applied to the base of transistor 35 is such that this transistor is made to operate in the linear amplification region whereas transistor 36 is operated in the saturation region by virtue of bias current provided by biasing resistor 37. Whereas transistors 35 and 36 are conducting, transistors 39 and 40 are cut off. This is accomplished by the reverse bias voltage applied between the base and emitter junction of transistor 40 which prevents transistor 39 from acting as an amplifier. The function of the diode 42 during this condition is to prevent the flow of base to collector current through transistor 39 and thence to transmission line 14.

The operation of the embodiment of FIG. 2 can be best understood by considering the regeneration of a train of coded pulses aplied to input terminals 14*a*. As described previously, the amplitude of the pulses need only be of sufficient value so that a reasonable signal to noise ratio exists. For the particular component values described above, reliable regeneration can be achieved with approximately 0.3 volt input pulse. A pulse train appearing across the input winding 31 *a* is coupled to the secondary winding 31*c* where it is differentiated (by virtue of the low reactance of the transformer with respect to the transistor input impedance) and then applied to the base of transistor 35 where it is amplified and coupled to the output winding 33*a* by transformer action of winding 33*b* with approximately 20 db voltage gain. After amplification in transistor 35, the amplified signal appearing across winding 33*b* is coupled to winding 33*a* for transmission to the next repeater. Upon being received at the next repeater, the signal is again differentiated before amplification whereupon the signal is again regenerated. The waveshapes of the regenerated signals are substantially the same as those illustrated in the above-referenced copending application.

As is obvious from the complementary circuit configuration of the pulse repeater, merely by reversing the polarity of the applied power and the applied input signals, it is possible to reverse the direction of transmission and hence provide the bidirectional repeater characteristics described above with reference to FIG. 1.

An alternative embodiment of a pulse repeater 16′ is illustrated in FIG. 3 in which the same principles of operation are utilized but for the elimination of the voltage divider network 34 and the addition of regenerative feedback windings 31*d* and 33*d*. Whereas the embodiment illustrated in FIG. 2 provides a quiescent bias current for transistors 35 or 39 (depending upon the polarity of the power source), to provide regeneration of low amplitude pulses, the embodiment illustrated in FIG. 3 has no quiescent current flow for these transistors. Accordingly, to enhance the operation of this embodiment of the invention to low amplitude pulses, it is necessary to provide regenerative feedback which in the case of transistor 35 is provided by transformer winding 33*d* and in the case of transistor 39 is provided by transformer winding 31*d*.

The embodiment illustrated in FIG. 3 has several advantages over that of FIG 2; namely, that of eliminating the need for a voltage divider network and hence the number of components. The reduction in the number of components is of utmost importance in a communications system utilizing large numbers of pulse repeaters. Accordingly, the embodiment of FIG. 3 illustrates a repeater of simpler construction than that of FIG. 2.

In summary, each of the embodiments of the invention thus described enables communication by coded pulse trains between two remotely located stations over a single transmission line by the use of bidirectional pulse repeaters, thereby enabling maximum utilization of the communications equipment.

What is claimed is:

1. A pulse communications system for communication between two remotely located transmitter-receiver stations by pulse codes comprising:

a bidirectional pulse repeating means to receive a pulse code from either of said stations and regenerate said code for transmission to the other of said stations, said repeating means being responsive to power of a first polarity for transmission in one direction and to power of an opposite polarity for transmission in the opposite direction; and means for supplying power to said bidirectional repeating means of said first polarity for communication in one direction and of said opposite polarity for communication in the opposite direction, wherein said bidirectional pulse repeating means comprises a pair of complementary transistor amplifiers each being connected to receive power from said power supply means, one of said transistor amplifiers being disabled by power of said first polarity and the other of said amplifiers being disabled by power of said opposite polarity, said disabling being controlled by a transistor switching means interconnected with each said amplifier means.

2. A pulse communications system as recited in claim 1 wherein each of said complementary amplifiers comprises:

a pair of emitter-collector connected transistors, one of said transistors being connected to receive an amplify pulse codes supplied thereto; and biasing means connected to said power supply means and said transistors for forward biasing one of said transistors in said pair in a linear amplification region and for forward biasing the other of said transistors in a saturated region, said biasing means further reverse biasing said pair of transistors to cut off when power of the respective disabling polarity is supplied to said biasing means.

3. A pulse communications system as recited in claim 2 wherein said power supplying means comprises:

a power source for supplying power;

a reversing switch connected for applying power to said biasing means and being responsive to a control signal for reversing the polarity of the power applied to said biasing means; and timer means for providing said control signal to said reversing switch to periodically cause reversal of the polarity of the power applied to said biasing means.

4. A pulse communications system for communication between two remotely located stations by pulse codes, said system comprising:

a transmitter-receiver means at each of the stations for transmitting and receiving pulse codes;

input means adapted to receive said pulse code from one of said stations and including a first transformer having a first winding adapted to receive said pulse code, a second winding and a third winding serially connected with said first winding;

output means for coupling the regenerative pulse code to the other of said stations including a second transformer having first and second windings serially connected, said second winding developing said regenerative pulse code thereacross, and having a third winding coupled to said second winding;

means coupling said pulse codes to said input and output means;

power means for supplying power of a first polarity for communication in one direction and of an opposite polarity for communication in the opposite direction;

bias potential means connected to said power means for providing a bias potential between said input means and said output means, said potential means having one terminal connected to one end of said second winding of said first transformer and having another terminal connected to one end of said third winding of said second transformer;

a first transistor having base, emitter and collector electrodes, said base electrode being connected to the other end of said second winding of said first transformer and said collector electrode being connected to said first winding of said second transformer;

a second transistor having base, emitter and collector electrodes, said collector electrode being connected to said emitter electrode of said first transistor and said emitter electrode being connected to another terminal of said bias potential means;

a third transistor having base, emitter and collector electrodes, said base electrode being connected to the other end of said third winding of said second transformer and said collector electrode being connected to one end of said third winding of said first transformer; and a fourth transistor having base, emitter and collector electrodes, said collector electrode being connected to said emitter electrode of said third transistor, said emitter electrode being connected to said one terminal of said bias potential and said base electrode being connected to said other terminal of said bias potential, whereby a pulse code received from one of said stations by said first winding of said transformer is regenerated by said first transistor and coupled to the other of said stations by said second winding of said second transformer and a pulse code received from the other of said stations by said second winding of said second transformer is regenerated by said third transistor and coupled to the one of said stations by said first winding of said first transformer.

5. A pulse communications system as recited in claim 4 further comprising:

a first regenerative feedback means connected intermediate said other end of said second winding of said first transformer and said base of said first transistor for causing said first transistor to regenerate said pulse code; and second regenerative feedback means connected intermediate said other end of said third winding of said second transformer and said base of said third transistor for causing said third transistor to regenerate said pulse code.

6. An apparatus for regenerating bilevel pulses comprising:

a transformer having first and second windings, said first winding having first and second taps intermediate the ends thereof and adapted to receive said bilevel pulses between one end and said first tap;

a second transformer having a first winding, said first winding having first and second taps intermediate the ends thereof;

a first transistor having base, emitter and collector electrodes, said base electrode connected to one end of said second winding of said first transformer and said collector electrode connected to one end of said first winding of said second transformer;

a second transistor having base, emitter and collector electrodes, said collector electrode connected to the emitter electrode of said first transistor and said emitter electrode connected to said second tap of said first transformer and said base electrode connected to said first tap of said second transformer; and biasing means connected between said second tap of said first transformer and said first tap of said second transformer for controlling the conduction of said transistors, whereby bilevel pulses appearing at said first winding of said first transformer are regenerated by said first transistor and appear as an output between said second tap and said other end of said second transformer.

7. An apparatus as recited in claim 6 further comprising:

a second winding coupled to said first winding of said second transformer;

a third transistor having base, emitter and collector electrodes, said base electrode connected to one end of said second winding of said second transformer and said collector electrode connected to the other end of said first winding of said first transformer;

a fourth transistor having base, emitter and collector electrodes, said collector electrode connected to the emitter electrode of said third transistor and said base electrode connected to said second tap of said first winding of said first transformer and said emitter electrode connected to said first tap of said first winding of said second transformer, whereby bidirectional pulse regeneration is achieved.

8. An apparatus as recited in claim 7 wherein said biasing means comprises:

a pair of oppositely poled breakdown diodes serially connected for providing a voltage drop thereacross; and a voltage divider network connected in parallel with said diode for causing said first and second transistors to regenerate said bilevel pulses when the voltage drop across said breakdown diodes is in one direction and to cause said third and fourth transistors to regenerate said bilevel pulses when the voltage drop across said breakdown diode is in the opposite direction.

9. An apparatus as recited in claim 7 further comprising:

first regenerative feedback means connected intermediate said one end of said first winding of said first transformer and the base of said first transistor for causing said first transistor to regenerate said bilevel pulses.

10. An apparatus as recited in claim 9 further comprising:

second regenerative feedback means connected intermediate said one end of said second winding of said second transformer and the base of said third transistor for causing said third transistor to regenerate said bilevel pulses.

References Cited

UNITED STATES PATENTS

| | | | |
|---|---|---|---|
| 2,652,446 | 9/1953 | Oberman | 178—2 |
| 2,812,388 | 11/1957 | Thomas. | |
| 2,810,081 | 10/1957 | Elliott. | |
| 2,930,849 | 3/1060 | Carver | 178—70 |

OTHER REFERENCES

General Electric Transistor Manual, 6th ed., pp. 180, 181, 1962.

JOHN W. CALDWELL, Primary Examiner

M. M. CURTIS, Assistant Examiner

U.S. Cl. X.R.

178—2, 16; 179—15